United States Patent [19]

Harwell

[11] Patent Number: 4,582,938

[45] Date of Patent: Apr. 15, 1986

[54] ALKYL POLYAMINE ETHERS AS CATALYSTS FOR ISOCYANATE REACTIONS

[75] Inventor: Howard L. Harwell, Zionsville, Pa.

[73] Assignee: Air Products and Chemicals, Inc., Allentown, Pa.

[21] Appl. No.: 544,918

[22] Filed: Oct. 24, 1983

Related U.S. Application Data

[62] Division of Ser. No. 414,759, Sep. 3, 1983, Pat. No. 4,436,842.

[51] Int. Cl.$^4$ .............................................. C07C 62/00
[52] U.S. Cl. .................................... 564/508; 564/503
[58] Field of Search ................................ 564/508, 503

[56] References Cited

U.S. PATENT DOCUMENTS 3,330,782  7/1967  Poppelsdorf ........................ 521/126
4,101,466  7/1978  McEntire ........................... 521/118
4,101,470  7/1978  McEntire ........................... 521/174

*Primary Examiner*—Maurice J. Welsh
*Attorney, Agent, or Firm*—Russell L. Brewer; E. Eugene Innis; James C. Simmons

[57] ABSTRACT

This invention relates to a polyamine composition suited for catalytically effecting reaction between organic polyisocyanate and an active hydrogen compound as measured by the Zerewitinoff method e.g. a polyol, a polyester polyol of polyether in the manufacture of urethane compositions. The polyamine is represented by the formula:

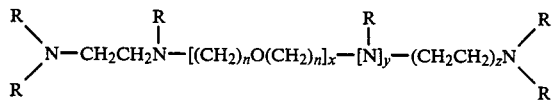

3 Claims, No Drawings

ALKYL POLYAMINE ETHERS AS CATALYSTS FOR ISOCYANATE REACTIONS

This is a division of application Ser. No. 414,759 filed Sept. 3, 1983 now U.S. Pat. No. 4,436,842 which issued Mar. 13, 1984.

TECHNICAL FIELD

This invention pertains to field of urethane catalysis. More particularly it pertains to polyamine ether compositions as catalyts for effecting reaction between an isocyanate and active hydrogen containing composition in the production of urethanes as well as a method for producing urethane compositions.

DESCRIPTION OF THE PRIOR ART

Foamed polyurethanes are generally prepared by the reaction of a polyisocyanate, and an active hydrogen containing composition as measured by the Zerewitinoff method, e.g. a polyol, polyester polyol or amine to produce urethane or urerthane type compositions. Typically these reactions have been catalyzed by including an amine as a catalytic component.

U.S. Pat. No. 2,941,967 discloses a process for catalytically enhancing the reaction of an isocyanate with a polyol by including mono and diamino ethers, e.g. dimethyl-(2-methoxyethyl)-amine and bis-(3-dimethylaminopropyl)-ether as a catalytic component.

U.S. Pat. No. 3,645,925 discloses an amine catalyst for a polyurethane reaction consisting of a 4,4'-dimorpholinodiethyl ether as well as in combination with other tertiary amines.

U.S. Pat. No. 3,480,675 and 3,330,782 disclose the use of tertiary amine ethers as catalyts for the reaction of organic polyisocyanate with active hydrogen-containing compounds. In the U.S. Pat. No. 3,330,782 patent beta-(N,N-dimethylamino) alkyl ethers are used as catalyts for the urethane reaction. In the '675 processes set forth for producing the alkyl ethers described in the U.S. Pat. No. 3,330,782 patent.

U.S. Pat. No. 4,101,466 and 4,101,470 relate to bis(-dimethylaminopropyl)-amine derivatives which include the ethers and the alcohol terminate systems. These components are alleged to have had catalytic activity for urethane synthesis.

SUMMARY OF THE INVENTION

This invention relates to alkylpolyamine ethers which are highly effective as a catalyst for urethane synthesis. The alkyl polyamine ethers are represented by the formula

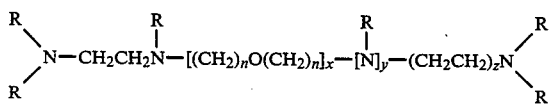

wherein R is methyl or ethyl,
n is 2,
x is 1,
y is 0 or 1 when X is 1,
z is 0 when Y is 0, and
z is 1 when Y is 1.

Several advantages are associates with the ether amine catalyst of this invention and these include:

good activity as a urethane and blowing catalyst in high resilient urethane foam formulations;

a catalyst which has relatively excellent blowing activity and permits a wide latitude of catalyst concentration thus permitting a wider use than many other ether amine catalysts;

a catalyst which has delayed action as indicated by moderate rise times and one that has good gel times; and a product which is highly effective on a weight basis and imparts no discoloration to the resultant product.

DETAILED DESCRIPTION OF THE INVENTION

This invention relates to alkyl polyamine and, more particularly, triamine and tetramine ether catalysts suited for catalyzing the reaction of a polyisocyanate with an active hydrogen-containing compound as determined by the Zerewitinoff method to formed urethanes or polyurea compositions. The alkyl polyamine ether of this invention is represented by the formula

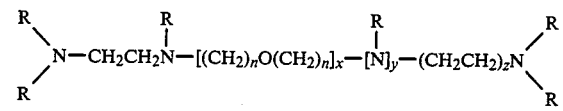

wherein R is methyl or ethyl,
n is 2,
x is 1,
y is 0 or 1 when X is 1,
z is 0 when Y is 0, and
z is 1 when Y is 1.

Two compositions of particular effectiveness contemplated by the formula are

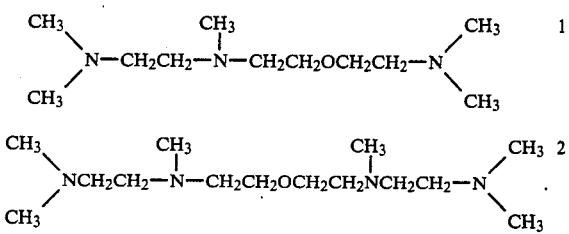

The amine of this invention can be used as a mixture in combination with other amines e.g. triamines such as triethylene diamine or it can be used alone depending upon desired formulation properties desired by the formulator. The concentration of the alkyl polyamine ether used in catalyzing the urethane reaction is in the range of 0.1 to 2 parts by weight per 100 parts by weight of polyol (active hydrogen containing composition) and is preferably in the range of from about 0.4 to 0.8 parts per 100 weights parts of polyol. The final selection of the catalyst concentration is at the discretion of the formulator.

In accordance with the practice of the invention a urethane forming composition is prepared comprising a polyisocyanate and an active hydrogen containing compound as determined by the Zerewitinoff method. Polyisocyanates suited for practicing invention are well known and these include those isocyanates having at least 2 isocyanate groups such as toluene diisocyanate, diisocyanato diphenylmethane, hexamethylene diisocyanate, chlorophenyl diisocyanate and bromophenyl diisocyanate and other aromatic and aliphatic di- or polyisocyanates as commonly utilized in the prior art.

The active hydrogen containing compounds suited for reaction with the polyisocyanate include polyols such as polyethylene glycol, polypropylene glycol as well as polyester glycols, and polyalkylene ether polyols such as poly (tetramethylene glycol, polypropylene glycol or a polycaprolactone.

Blowing agents are often used in preparing the cellular urethane compositions and the blowing agent can be water or volatile organic agents commonly used in the industry. These include dichlorodifluoromethane, trichlorofluoroethane, methylenechloride, carbon tetra chloride, butane, pentane, etc. Foam stabilizers and surfactants are also utilized in the cellular urethane compositions and these include silicone block polymers comprising polyalkylene glycol units.

Quite often it is customary to incorporate an organo tin compound in combination with the ether amine in order to achieve desired catalytic activity. Organo tin compositions in combination with various amines and particularly tertiary amine are known and shown in U.S. Pat. No. 3,330,782 which is incorporated by reference. Examples of tin compound include tributyltin hydroxide, tributyltin methoxide, dibutyl tin dilaurate, dibutyl tin diacetate, and so forth. Representative examples are also shown in the U.S. Pat. No. 3,330,782 patent.

The following examples are provided to illustrate preferred embodiments of the invention.

EXAMPLE 1

Preparation of N'-(2-dimethylaminoethyl-N,N',N'-trimethyl-bis(2-aminoethyl)ether The sodium derivative of N,N',N'-trimethylaminoethylethanolamine was prepared by reaction of 63.8 g of sodium metal and 608 g N,N,N'-trimethylaminoethylethanolamine at temperatures up to 100° C. under a nitrogen atmosphere. To the sodium derivative was added 200 g B-chloroethyl dimethylamine hydrochloride in portions at room temperature. An additional 100 g of N,N',N'-trimethyl aminoethylethanolamine was added during this addition to make the solution less viscous. The mixture was then heated for 3 hours at 100° C. On cooling, the formed salt was filtered off, and the filtrated was distilled under vacuum. By fractionally distillating pure product boiling at 110°-111° C./3 mm was obtained. Gas chromatography of the product showed a single peak and NMR verified the structure of the compound.

The reaction carried out above was in the general manner of the classical Williamson ether synthesis.

EXAMPLE 2

The catalyst of Example 1 was used to catalyze a standard laboratory urethane formulation and then compared against other amine catalysts including ether amine catalysts as utilized in the prior art. The testing procedure involved preparation of a urethane forming composition comprising

|   |   | Parts |
|---|---|---|
| 1 | Multranol M3901 | 65 |
| 2 | Multranol E-9151 | 35 |
| 3 | Water | 3.0 |
| 4 | Genetron 11SBA | 20.0 |
| 5 | Silicone L-5307 (a polysilicone surfactant) | 1.5 |
| 6 | UL-1 present as a 10% | |

|   |   | Parts |
|---|---|---|
|   | solution in dioctylphthalate | .05 |
| 7 | Iso-E-494 | 38.8 |

The above urethane formulation was mixed with various proportiond of the amine component and various co-catalysts and the reactivity of the catalyst determined. The sample size was approximately 308 grams.

Table 1 shows test results of the Example 1 catalyst at various levels as compared to other common amine catalysts.

The following is a description of the elements 1-7 as recited above:
(1) 6000 molecular weight polyol, OH number of 28, supplied Mobay Chemical Company
(2) Polyurea dispersion in a 6000 mol wt. polyol of OH Number 28 and 0.45% water, supplied by Mobay Chemical Company
(4) Polyurea dispersion in a 6000 mol wt. polyol of OH Number 28 and 0.45% water, supplied by Allied Chemical Company
(6) Tin carboxylate, supplied by Witco Chemical Co.
(7) Blend of 75% toluenediisocyanate (80% 2,4- and 20% 2,6-) and 25% methylene diphenyldiisocyanate, supplied by Mobay Chemical Company.

TABLE 1

| Run | Amine Catalyst | Level php | cream time seconds | rise time seconds | hard gel time seconds |
|---|---|---|---|---|---|
| 1 | Example 1 | 0.5 | 5 | 115 | 110 |
| 2 | Niax A-1 | 0.5 | 4 | 100 | 90 |
| 3 | Example 1 | 0.75 | 5 | 80 | 80 |
| 4 | Thancat DD | 0.5 | 10 | 170 | 185 |
| 5 | Thancat DD | 0.75 | 7 | 120 | 125 |

Niax A-1 = 70% bis(2-dimethyl aminoethyl)ether and 30% dipropylene glycol
Thancat DD = catalyst having the structure $(CH_3)_2 N\ CH_2\ CH_2\ CH_2\ O\ CH_2\ CH_2 —N(CH_3)_2$ The data in Table 1 demonstrates that the catalyst of Example 1, while being slightly less active than the Niax A-1 catalyst, is within an acceptable level and can be used at either of several concentration levels, 0.5 or 0.75 php, whereas the A-1 catalyst could only be used at the lower level. At the level of 0.75 parts the Niax A-1 catalyst is overly active causing severe foam shrinkage. The catalyst of Example 1 thus has a greater latitude in the concentration that can be employed. At 0.75 php, it is more active than Niax A-1 at 0.5 php while still producing an acceptable foam product. Compared to another ether diamine (Thancat DD), the product of Example 1 shows greater reactivity at both 0.5 and 0.75 php.

What is claimed is:

1. An alkyl polyamine suited for catalyzing a reaction between an isocyanate and an active hydrogen containing compound as measured by the Zerewitinoff method represented by the formula:

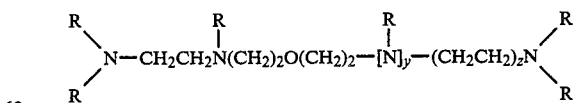

wherein R is methyl,
y is 0 or 1
z is 0 when Y is 0, and
z is 1 when Y is 1.
2. The polyamine of claim 1 where Y is 0.
3. The polyamine of claim 1 wherein Y is 1 and Z is 1.